Nov. 8, 1932.                L. F. TRETTIN                1,886,763
                               CONFECTION
                           Filed April 4, 1930

INVENTOR:
Louis F. Trettin,
BY Hugh K. Wagner,
ATTORNEY.

Patented Nov. 8, 1932

1,886,763

UNITED STATES PATENT OFFICE

LOUIS F. TRETTIN, OF ST. LOUIS, MISSOURI, ASSIGNOR OF THREE-EIGHTHS TO HUGH K. WAGNER, AND ONE-EIGHTH TO WALTER H. NOHL, BOTH OF ST. LOUIS, MISSOURI

CONFECTION

Application filed April 4, 1930. Serial No. 441,462.

This invention relates to frozen confections, and one of the objects of the invention is to produce a new article of food in the form of a confection which shall be nutritious, palatable and healthful.

Another object of the invention is to provide a frozen confection consisting of ice cream or another ice and a fudge that will adhere to the ice and yet will not freeze like ordinary fudge.

Another object is to provide a fudge constituted so that it will not stick or become sticky.

Other objects, advantages and desirable features of the invention will appear in the course of the following description of an illustrative embodiment of the spirit thereof.

Figure 1:
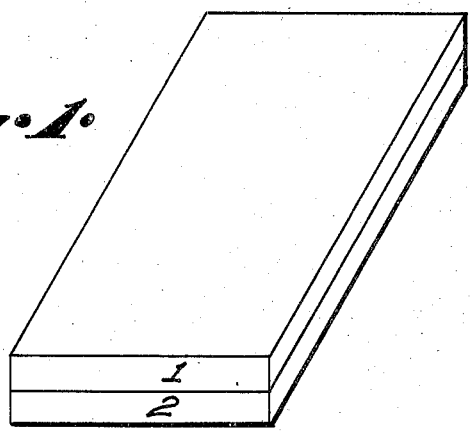
Figure 2:
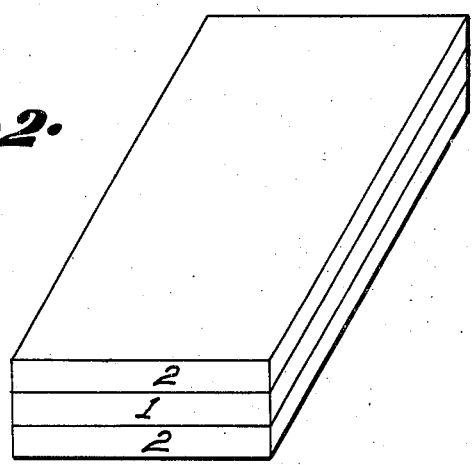
Figure 3:
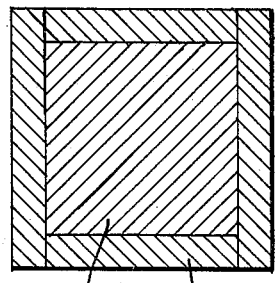

In the accompanying drawing forming part of this specification, in which like numbers of reference denote like parts wherever they occur, Figure 1 is a perspective view of one form of the invention consisting of a layer of fudge on a layer of an ice;

Figure 2 is a perspective view of another form of the invention consisting of a layer of fudge interposed between layers of an ice; and Figure 3 is a sectional view of another confection made in accordance with this invention and comprising a core of fudge and a coating of an ice.

The following is the formula of the fudge which has given the best results in practice: ten pounds of granulated sugar; two pounds of corn sugar; one pound of milk powder; one ounce of hard fat, such, for instance, as cocoa butter, Nuco butter or cocoanut oil; one ounce of glycerin, one-half pound of nougat whip containing sugar, corn syrup and egg white; and one teaspoonful of salt. For flavoring, there may be added to the foregoing mixture one ounce of vanilla extract, or one pound of bitter chocolate liquor, or one ounce of maple flavor. The mixture is boiled and stirred at a temperature of two hundred thirty eight degrees Fahrenheit until it has become thoroughly homogeneous, and is then poured out into a pan in sufficient quantity to form a slab of the desired thickness upon solidification. The slab is then sub-divided into smaller slabs of the desired size for use in the confection. The function of the milk powder is to give richness and body; the hard fat keeps the fudge from being sticky like butter-scotch and the glycerin prevents freezing of the fudge in the frozen confection and thereby renders it soft enough to be easily bitten off and eaten. Moreover, it does not acquire the granular structure that is one of the characteristics of fudge that has been made in the usual manner and then frozen. If desired, nuts, fruits or coconut may be added to the fudge mixture before it solidifies.

The ice component of the frozen confection may be ice cream or another ice or a mixture of such ices; and it may, for instance, be formed of cream, whole milk, skim milk, or milk diluted with water, or of water colored or flavored. The ice cream or other ice may be frozen into the form of blocks, slabs, or layers and sub-divided into slices or slabs of the size of the slabs of fudge and united therewith to form a composite frozen confection of an ice adherent to fudge. The fudge and ice may be combined in divers manners. For instance, Figure 1 exhibits a layer of fudge 1 on a layer of an ice 2; Figure 2 illustrates a layer of fudge 1 interposed between layers of an ice 2; and Figure 3 shows a core of fudge 3 surrounded by a coat of an ice 4.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. A confection comprising an ice and fudge containing glycerin.

2. A confection comprising fudge containing glycerin and a layer of an ice on said fudge.

3. A confection comprising alternate layers of an ice and glycerin-containing fudge.

4. A confection comprising an intermediate layer of glycerin-containing fudge and outer layers of an ice.

5. A confection comprising a core of glycerin-containing fudge and a coat of an ice surrounding said fudge.

In testimony whereof I hereunto affix my signature.

LOUIS F. TRETTIN.